3,345,284
CARBONACEOUS ION EXCHANGE MATERIALS
James Stephen Ogden, Ashland, Ky., assignor to Ashland Oil & Refining Company, Houston, Tex., a corporation of Kentucky
No Drawing. Filed Oct. 12, 1964, Ser. No. 403,338
5 Claims. (Cl. 208—44)

The present invention relates to carbonaceous ion exchange materials having improved properties and to the preparation of such materials. More particularly, the present invention relates to the preparation of high capacity cation exchange materials from carbonaceous materials.

It has been common practice to utilize cation exchange materials in the softening or purifying of water. In such use, these materials are capable of exchanging certain of their cations for various cations, generally metallic ions, contained in the water. For this purpose, the exchange material can be in its hydrogen ion form, in which case hydrogen is exchanged for cations in the water. After its use in the exchange reaction, the material may be easily regenerated by treatment with dilute mineral acids, such as, 2% HCl, etc. This is commonly referred to as the utilization of the material in the "hydrogen cycle." It is also possible to utilize the same material in what is known as the "sodium cycle." In this instance, a material containing exchangeable hydrogen ions is treated with a sodium compound to exchange sodium for the hydrogen ions. The sodium form may then be utilized in the treatment of water to remove, by exchange, materials which are exchangeable with sodium in accordance with the Hoffmeister series. The sodium cycle material may, in turn, be regenerated by treatment with dilute solutions of a sodium compound, such as, sodium chloride.

Cation exchange materials may be used for various other purposes; including, deionizing, when combined with an ion exchange material; as reaction catalysts; for analytical work; and for the removal of metal contaminants from reaction catalysts.

In the cation exchange art there are two generally accepted categories of ion exchange materials dependent primarily upon the reactant material. The first category will be referred to hereinafter as "synthetic ion exchange resins," and it includes such plastic or resinous materials as are formed by carrying out condensation or polymerization reactions to produce phenol-formaldehyde, pyrogallol-formaldehyde, polystyrene, and various other resin or plastic materials and thereafter sulfonating the resin material. Such synthetic ion exchange resins are normally formed from pure liquid compounds and, generally, are of the thermosetting type. They, therefore, require close control in the manufacture and are quite expensive. The other category will be referred to hereinafter as "carbonaceous ion exchange materials" and it includes ion exchange materials obtained by sulfonating carbonaceous starting materials, particularly asphaltic materials. These starting materials are naturally "resinous," solid or semi-solid materials and require no preparation other than purification or separation. The ion exchange materials produced therefrom have the general advantage of being inexpensive, since many of these starting materials are by-products of other processes. However, to the present date, the exchange capacity of carbonaceous ion exchange materials has not been competitive with the synthetic ion exchange resins. For example, materials prepared in accordance with the French Patent 831,917 to Austerweil are reported to have an exchange capacity of 36 grams of calcium ion per kilogram of product, which is equivalent to 1.8 meq. calcium carbonate per gram of dry material; those prepared in accordance with a technique disclosed in U.S. Patent 2,748,058 are reported to have a maximum exchange capacity of 1.43 meq. The synthetic ion exchange resins have reported values of 1.8 meq. and higher. Thus, there is sometimes sufficient difference in the capacities of the two categories of ion exchange materials to justify paying the difference in price.

The preparation of carbonaceous cation exchange materials has been described in a large number of patents and publications. In general, the starting materials for these carbonaceous ion exchange materials include: bituminous coal; peat; lignite; natural-occurring asphalts, such as Gilsonite; and asphalts derived from crude oils. Of particular interest as starting materials are asphalts derived from liquid crude oils, since the resultant asphalts are generally a low-cost product and are often by-products which have little real value as such. Various sulfonating agents have been utilized, including concentrated sulphuric acid, oleum and gaseous sulphur trioxide.

One source of asphalts suitable for use as a starting material is sulphuric acid sludge obtained in the refining of crude oils as, for example, in the purification of lubricating oil fractions. Briefly, one such process involves dissolving the lubricating oil fraction in liquefied propane, deasphalting and dewaxing the fraction according to known methods and thereafter treating the fraction with sulphuric acid. The acid treatment of the lubricating oil fraction improves the quality of the lubricating oil and produces a viscous black sludge as a by-product. Another such operation treats a crude residuum with propane, deasphalts and dewaxes the fraction and then treats with sulphuric acid to produce a bright stock. This process also results in an acid sludge material. Similar acid treatments of mineral oil fractions to produce medicinal oils have also been utilized. Such acid sludges have simply been heated to produce a granular cation exchange material.

Suitable starting materials for the preparation of carbonaceous ion exchange materials may also be obtained through further treatment of the asphalts from the above-mentioned sources. Further refinement or separation of these asphalts is generally brought about by treatment with selected solvents, such as, pentane, isopentane, hexane, etc. In such treatment, an oily and resinous material dissolves in the solvent and is removed therewith and an undissolved portion is precipitated out. The precipitated portion is ordinarily referred to, as asphaltenes. These asphaltenes are also useful starting materials for producing cation exchange resins. Likewise, asphalts of the character previously mentioned may be oxidized or "blown" to produce suitable materials.

Still other sources of asphaltic materials are by-products of the catalytic cracking of crude oils. Heavy oils generally boiling between about 700° F. and 900° F., are obtained as a bottoms product from the fractionator utilized to separate catalytic cracking products. These materials are often referred to as catalytic cracking "slurry oils" and contain substantial amounts of aromatic hydrocarbons. By oxidation and solvent extraction of an aromatic concentrate extracted from slurry oil, asphaltenes can be obtained.

While the previously mentioned French Patent 831,917 relates generally to the sulfonation of petroleum pitches having low melting points, this technique can be utilized to produce carbonaceous ion exchange materials from asphaltenes. However, in U.S. Patent 2,748,057, Goren indicates that ion exchange materials prepared from precipitated asphalts in accordance with the technique of the French patent had a capacity of only 0.50 meq. in the hydrogen ion cycle. This value compares quite unfavorably with the value of about 1.8 reported in the French patent. Goren then goes on to teach the preparation of ion exchange resins from "asphalt type bituminous materials" by a two-step process. Specifically, in accordance with Goren, the asphaltic material is first treated with concentrated sulphuric acid and thereafter with oleum. When precipitated asphaltenes were treated in accordance with the technique of Goren, it was found that the capacity of such material in the hydrogen cycle was about 1.4 to 1.8 and in the sodium cycle was about 1.37 to 1.6.

Thus, the technique of Goren produces a product somewhat better than experimentally obtained values of the products of the French patent and about equal to the reported values of the French patent. However, these capacities are also much less than most synthetic resins. Therefore, there remains a demand for methods of converting low-cost carbonaceous raw materials into ion exchange materials of a capacity comparing favorably with the capacities of synthetic ion exchange resins.

The principal object of the present invention is to fulfill the above demand. Another object of the present invention is to provide an improved method for producing carbonaceous ion exchange materials from selected asphaltic materials. Still another object of the present invention is to provide an improved method for producing carbonaceous ion exchange materials wherein the temperature of treatment is controlled within critical limits. A further object of the present invention is to provide an improved method for producing carbonaceous ion exchange materials wherein specific and critical comminution techniques are employed. Another object of the present invention is to provide an improved method for producing carbonaceous ion exchange materials wherein a unique purification and washing cycle is utilized. Yet another object of the present invention is to provide an improved method for producing carbonaceous ion exchange materials wherein a critical drying cycle is utilized. Still another object of the present invention is to provide an improved process for producing carbonaceous ion exchange materials wherein a unique conversion to the sodium cycle is employed. A further object of the present invention is to provide an improved method for producing carbonaceous ion exchange materials having high exchange capacities. Yet another object of the present invention is to provide an improved combination of steps for the production of carbonaceous exchange materials. These and other objects of the present invention will be apparent from the following detailed description and examples.

Briefly, in accordance with the present invention, asphaltenes are fused and thereafter crushed and screened to a preselected size. The screened particles are then treated, while stirring and crushing large particles and agglomerates, with an excess of oleum. When the initial temperature of reaction begins to drop, heat is applied for a period sufficient to permit gelation and an apparent dry point to occur. By apparent dry point is meant the disappearance of visually observable liquid from the mixture, the appearance of dryness and the presence of granular, free-flowing grains. The mixture is then heated, with stirring and crushing, to a preselected higher temperature. The hot particles are thereafter quenched in cold water. The acid, diluted by the water quench, is then drained off and the solid particles are washed with an additional volume of cold, substantially ion-free, e.g. deionized, water. Following the cold water wash, a volume of boiling, substantially ion-free water is utilized to wash the material free of colloidal brown acids until a clear effluent is produced. When the wash water is colorless, the material is dried to a preselected moisture content and is stored in sealed containers to preserve the moisture. This sequence of steps produces a highly effective cation exchange material in the hydrogen cycle. When it is preferred to utilize the material in the sodium cycle, the wet, washed material may be treated with a strong sodium chloride solution, washed free of excess sodium chloride by the use of substantially ion-free water, and thereafter dried to the critical moisture content and stored in sealed containers.

For purposes of comparison, the following tests were carried out to prepare ion exchange materials by the same general technique taught in French Patent 831,917:

*Example 1*

Thermally cracked and vacuum reduced slurry oil from catalytic cracking is oxidized to produce binder asphalt having a softening point of 150° F. Udex raffinate, the raffinate remaining after extraction of benzene, toluene and xylene from reformed gasoline, is employed to precipitate asphaltenes from the asphalt. 200 grams of the resultant asphaltenes were mixed with an excess of spent alkylation acid, sulfuric acid which has been utilized in the alkylation of petroleum. The reaction became exothermic at a temperature of about 130° F. with the evolution of sulphur dioxide. Heat was applied for 2 hours at 230° to 250° F. and the mixture was then permitted to cool. The mixture was poured into two parts of water and filtered through a sintered glass funnel. Clarification and washing of excess acid was carried out with deionized water. Thereafter, the mixture was dried at about 400° F. A second batch of the asphaltenes and spent acid was then mixed, heated and added to the first material and the whole was heated to 300° F., and washed and dried, as previously outlined. The capacity of this material was found to be 0.40 meq.

*Example 2*

Solvent precipitated asphaltenes of the same character as Example 1 were crushed and screened to 20–40 mesh size. The screened material was treated with spent alkylation acid containing 5% $K_2Cr_2O_7$. Heat was applied as in the previous example and in one-half hour the mass appeared dry. After quenching, and washing with water, NaOH, HCl, and further amounts of water, the product was dried. This hydrogen cycle material was found to have a capacity of 0.37 meq.

*Example 3*

The process of Example 2 was again carried out under the same conditions except that 10% $K_2Cr_2O_7$ was utilized. This product was found to have a capacity of about 0.28 meq.

From the above tests, it appeared that the sulfonation of asphaltenes with spent alkylation acid according to the procedure of the French patent was not capable of producing cation exchange materials having acceptable exchange capacities. Whether this deficiency was due to the inapplicability of the French technique to solvent precipitated asphaltenes, the insufficiency of the acid treatment, or some other condition, is problematical. Accordingly, tests were then conducted to determine whether improved materials could be produced through multiple-step acid treatment, such as that taught by Goren in Patent 2,748,057. Accordingly, the following tests were carried out:

*Example 4*

Asphaltenes from binder asphalt were calcined for 3 hours at 1000° F. in the presence of spent alkylation acid. 80 grams of this product, screened to 20–80 mesh, was mixed with 400 grams of 20% oleum. Heat was applied to hold the temperature at 230° to 240° F. for 1 hour, and, thereafter, at 280° to 320° F. for 2 hours. The product was then cooled, washed with water and neutralized with sodium hydroxide. Thereafter, hot distilled water was used to wash out unreacted materials and the material was dried and screened. This material in its sodium form had a capacity of about 1.8 meq. However, there was a pronounced discoloration of the treated water when the material was used experimentally to check its capacity. This discoloration is commonly referred to as "color throw off."

*Example 5*

Asphaltenes from binder asphalt were treated with 20% oleum and calcined at a temperature of 1200° F. for a period of 12 hours. This material was then treated in the same manner as the material of Example 4. The sodium cycle capacity of the material was found to be 0.036.

*Example 6*

Asphaltenes which had been solvent extracted from oxidized slurry oil and then heated to about 900° F. to remove residual solvent, were screened to 20–80 mesh. Eight parts of 20% oleum, per part asphaltenes, were divided into four portions and successively utilized to treat the asphaltenes at 280°, 260°, 240° and 220° F., respectively. After each treatment, the mass became dry and excessively large lumps were broken. Thereafter, the temperature was raised to 400° F. and maintained for 2 hours. The product was decanted, washed with deionized water and then dried to a constant weight. The capacity of this hydrogen cycle material was 2.0 meq. The material was then regenerated with 10 grams of NaCl in a 12.5% solution to produce a material in the sodium cycle. The cation exchange capacity was 1.58 meq.

*Example 7*

One part of 20–40 mesh asphaltenes from binder asphalt was treated with 10 parts of 20% oleum in two equal portions with washing with deionized water and drying after each of the two acid treatments. The final temperature in each case was 300° F. The hydrogen cycle capacity of this material was 1.66 meq. and in the sodium cycle it was 1.01 meq.

*Example 8*

The same material as in the previous example was treated with 5 parts of oleum per part of asphaltenes in two batches with washing and drying between treatments. The acid was added in small proportions to each batch. The heat, in each case, was raised to 300° F. for 1 hour. After washing with deionized water and drying, the hydrogen cycle capacity was 1.92 meq. and the sodium cycle capacity was 1.68 meq.

*Example 9*

Ten parts of oleum were added to one part of asphaltenes from binder asphalt in eight steps. In each case, the material was stirred and heated to dryness and the final mixture was heated to 350° F. for 1 hour. After washing with deionized water and drying, it was found that the hydrogen cycle capacity was 1.66 meq. This material was then regenerated with 5 grams NaCl in a 15% solution and its sodium capacity was found to be 1.4 meq.

*Example 10*

Slurry oil asphaltenes having a 400° F.+ SP (Softening Point by ring and ball method) were treated with 5.4 parts of 96% $H_2SO_4$ at 302° F. for 2 hours. The product was washed and thoroughly dried. Thereafter, the dried product was treated with 5.4 parts of 20% oleum at 302° F. for 1 hour. (At the end of 20 minutes the particles formed were dry.) Lumps of the material were chopped so that the particle size would be less than about 1.5 centimeters in diameter. This product was washed free of strong acids. Fines and colloidal acids were removed by decanting and washing on a vacuum filter using boiling deionized water. The product was thereafter dried at 230° F. In the hydrogen cycle form this material had a capacity of 1.83 meq., and in the sodium cycle form, a capacity of 1.65 meq.

Since the multiple acid treatment previously mentioned did not produce materials of the desired capacity, although some were of acceptable character, it was therefore decided that a single step treatment with oleum was probably most effective.

*Example 11*

100 grams of 20–40 mesh asphaltenes from binder asphalt were heated with 500 grams of 20% oleum. The temperature was raised to 240° F. until the product appeared dry. The particles were permitted to cool for 1 hour and then heating was continued to 300° F. The heated mass was then quenched in three liters of deionized water, filtered and washed with an additional amount of water. After drying the product was found to have a capacity of 1.0 meq. in the hydrogen cycle. The material was then regenerated with dilute HCl, washed with water and then regenerated with a 14% solution of NaCl. The capacity in the sodium cycle material was 1.50 meq.

*Example 12*

Larger than 40 mesh particles obtained from the treatment set forth in the previous example were further treated with 5 parts of 20% oleum per part dry material. The mixture appeared dry at 220° F. After standing for 2 hours, the mass was heated to 300° F. for 2 additional hours. This product was washed, dried and screened to 20–80 mesh. The hydrogen cycle capacity was 1.62 meq. Regenerations to the sodium cycle were carried out with 20 grams NaCl in an 11.7% solution, 5 grams NaCl in a 7.7% solution and 2.5 grams NaCl in a 7.7% solution. These respective treatments gave capacities of 1.64, 1.68 and 1.41 meq.

*Example 13*

One part of asphaltenes from binder asphalt, in the 20–40 mesh range, was treated with 10 parts of oleum and heated to 300° F. for 1.75 hours. The resultant material was washed and dried at 230° F. The hydrogen cycle capacity of this material was 1.93 meq. Conversion to the sodium cycle with a 15% NaCl solution resulted in a product having a capacity of 1.68 meq. Subsequent regenerations with 17%, 19% and 19% solutions of NaCl gave capacities of 1.86, 1.77 and 1.84 meq., respectively.

*Example 14*

Ten parts of 20% oleum were added to 1 part of 30–80 mesh asphaltenes, having a 375° F. softening point and obtained from binder asphalt. The material was stirred and the larger lumps broken up during treatment. The conversion to an apparent dry product was completed at 240° F. in 20 minutes. The heat was thereafter raised to 400° F. and the mass was cooled and then poured into 2 liters of cold tap water. After washing the material with tap water it was wet sieved in size increments of larger than 20 mesh, 20–40 mesh and 40–60 mesh. A sample of each size was dried, with stirring, on a 200° F. steam bath to produce materials having moisture contents of 73%, 62% and 61%, respectively. The materials were activated with 25% NaCl solution and had sodium cycle capacities of 1.31, 1.60 and 1.73 meq., respectively.

*Example 15*

One part of the same asphaltene material as that employed in the previous example was preheated to 200° F. and then treated with 10 parts of 20% oleum, and heated to 350° F. in thirty-five minutes. The material was permitted to stand in 2 liters of cold tap water overnight. After decanting the solids were washed with hot tap water until the filtrate was clear. The material was then dried on a steam bath at 195° F. until the moisture content was 61%. After activating with 25% NaCl solution the sodium cycle capacity was 1.90 meq.

*Example 16*

One part of 20–80 mesh asphaltenes of the type employed in Example 6 was heated to 150° F. and then treated with 10 parts of 20% oleum. Gelation occurred at 260° F. and a temperature of 350° F. was reached in 40 minutes. The product was quenched in cold tap water and thereafter washed in boiling tap water. Drying was carried out at 195° F. to a moisture content of 73% and the material was sieved to larger than 80 mesh. Upon activating with 5 grams of NaCl, in a 25% solution, the sodium cycle capacity was 2.0 meq.

Example 17

One part of the 30–80 mesh asphaltenes employed in Examples 14 and 15 was treated with 10 parts of 20% oleum. The temperature was increased to 250° F. After quenching with cold tap water, decanting and filtering with boiling tap water, the material was crushed to about 12 mesh and washed free of brown acids. Drying was carried out to a 64% moisture content and the product was sieved to larger than 60 mesh. A capacity of this material in the sodium cycle was 2.32 meq.

In another test carried out under the same conditions, the asphaltenes were preheatedt o 150° F. and drying was carried out to a moisture content of 68%. This material had a sodium cycle capacity of 2.11 meq.

Example 18

The asphaltenes employed in Example 16 were used in a ratio of 1 part asphaltenes to 10 parts of 20% oleum. The temperature was raised to 275° F. and it was observed that gelation occurred at 260° F. The product was quenched in cold tap water, decanted and washed with boiling tap water, as in the previous example. Drying was carried out to a moisture content of 66%. The sodium cycle capacity was found to be 2.29 meq.

This series of tests indicates that a temperature which is too high or too low will result in a product having a capacity which is approximately equivalent to that of the prior art, but still not much of an improvement. However, at temperatures between the extremes set forth above, it was found that a vastly superior material was produced.

Example 19

Asphaltenes from oxidized slurry oils, having a mesh size of 20–80 mesh, were treated with 20% oleum at a ratio of 10 parts acid to 1 part asphalt. At a temperature of about 250° F. the material gelled and it was thereafter heated to 300° F. in 70 minutes. After washing with deionized water and partial drying to a moisture content of 77.2%, it was found that hydrogen ion capacity was 2.45.

The product of the above was then further washed with boiling tap water, sized to 20–60 mesh and dried to 71% moisture content under radiant heat. The sodium cycle capacity for this material was about 2.51 meq.

Example 20

Solvent-precipitated asphaltenes, from binder asphalt, having a size of 20–40 mesh, were treated with 20% oleum in a ratio of 10 parts acid and 1 part asphalt. After the apparent dry point was reached, the material was heated to 300° F. in 65 minutes. After quenching with cold deionized water, the product was washed and partially dried. The resulting material, with a moisture content of about 77.6%, had a hydrogen cycle capacity of 2.55 meq.

A sample of this material was then screened to 20 to 80 mesh. This material had a moisture content of about 80%. The hydrogen ion capacity was found to be 2.87 meq. and when regenerated with 5 grams of 20% NaCl solution, the sodium cycle capacity was 2.61 meq.

The 20–80 mesh material was further dried under vacuum at a temperature of 175° F. for 2 hours, yielding a product having 29% moisture content. The capacity of this material in the hydrogen cycle was 2.61 and in the sodium cycle 2.44. The material was then run through four more sodium cycles and the capacities were found to be 2.41, 2.54, 2.49 and 2.37 meq., respectively.

In light of this evidence that retaining a predetermined amount of moisture on the material appeared to be an important factor, the 20–80 mesh material was then dried completely at 230° F. The hydrogen cycle capacity of this completely dried material was found to be 1.4 meq. and the sodium cycle capacity was 1.37 meq.

Example 21

As a further check, an exchange material was prepared exactly the same way as that of Example 10, except that the material was only partially dried. At a moisture content of 71%, the material had a hydrogen cycle capacity of 2.16 meq. and on a sodium cycle, capacity of 2.0 meq. Further drying to 65% moisture produced a material having a hydrogen cycle capacity of 2.36 and still further drying to 29% moisture produced a material having a hydrogen cycle capacity of 2.40.

In other attempts to utilize the technique set forth in U.S. Patent 2,748,057, it was found in some cases that the treatment of solvent precipitated binder asphaltenes gave an inferior product having an extremely high color throw off. In one treatment of asphaltenes obtained from oxidized slurry oils, an unworkable mass of colloidal acids and fines was produced.

In the tests set forth above, the capacity of the material was determined by placing 20 grams of the product in a metal-free or zero hardness water and pouring this slurry into a half-inch glass column. Hard water containing 500 p.p.m. hardness, as $CaCO_3$, but in the form of $Ca(NO_3)_2$, is passed through the material until the hardness of a 50 ml. sample reaches 20 p.p.m. A Schwartzenbach titration was utilized which requires a nearly neutral solution. Accordingly, acidic effluents were neutralized with 0.5 N NaOH solution from a buret. Enough methyl orange indicator was added to the NaOH solution so that a few drops of the latter would give a faint pink coloration to the acidic 50 ml. portion of the effluent. Milliequivalents (meq.) of $CaCO_3$ per gram are calculated as follows:

$$\text{Meq./gram} = \frac{\text{p.p.m. hardness} \times \text{volume of effluent}}{50,000 \times \text{dry weight of bed.}}$$

The results of the above examples, plus a number of additional tests indicate that superior ion exchange materials of extremely high capacities can be produced by the following detailed procedure.

Asphaltenes which have been stripped of the solvent used to precipitate them from an oxidized asphalt are preferred starting materials. As previously indicated, these materials may be obtained from ordinary binder asphalts which have been oxidized and solvent precipitated, or they may be obtained from oxidized, aromatic slurry oils of catalytic cracking operations. These asphaltenes may also be chlorinated and calcined at temperatures of about 600° to 850° F. or treated with acid sludges or sulphuric acids and calcined at temperatures of about 1000° to 1200° F. prior to use. In addition, treatments at ordinary temperatures (for example, in the neighborhood of 300° F.) with sulphuric acid may also be carried out, provided however that the material is completely dried before treatment in accordance with the present invention. It has been found that simply draining used acid from the material and then treating dilutes the subsequently used acid, particularly when oleum is preceded by an acid of lower concentration. In addition, the subsequent reaction with sulphuric acid may be speeded up to a certain extent by preheating the asphalt to a temperature of about 120° to 150° F.

The asphaltenes should be melted, allowed to solidify and then crushed and screened. The screening is preferably carried out to produce a material in about the 20–80 mesh range, preferably about 30–80 mesh. Such crushing and screening is important to the final product, inasmuch as the treatment causes substantial swelling of the asphalt material and the initial mesh is to a great extent determinative of the final product. It has also been found that if too many fines or extremely small mesh size materials are present initially, the end product is not of the capacity desired in accordance with the present invention.

The crushed and screened asphaltenes are then treated with oleum, preferably about 20% oleum, in a single treatment. As previously indicated, a multi-step treatment can be carried out but it should be carried out in such a manner that the material is completely dried after each treatment. However, no real advantage was found in using more than one treatment at the proper conditions.

The ratio of acid to asphalt should be between about 1 to 1 and about 10 to 1, and preferably between about 8 to 1 and about 10 to 1. The reaction time may be anywhere between about one-half hour to about three hours. Actually, the reaction time depends upon the condition of the material during the reaction. The treating time is determined by observing the point at which a gel is formed and, subsequently, the point at which the material appears dry. The initial treating temperature also depends upon the point of gelation and drying. In any event, when the initial exothermic reaction temperature of about 180° F. begins to drop, heat should be applied to maintain a temperature in the neighborhood of about 180° to 280° F. A temperature of about 180° to 220° F. is preferred for asphaltenes from binder asphalt and 240° to 260° F. is preferred for asphaltenes from oxidized slurry oil.

After the mass has gelled and the dry point has been reached, the temperature should then be raised to a temperature in the range of about 280° to 350° F., and preferably as close to 300° F. as possible. While heating, the mass should be stirred and, if necessary, the larger lumps crushed again. This mass may be screened at this point to remove materials larger than about 10 to 12 mesh or screening may be delayed until the later stages of the operation. As previously pointed out, if the temperature of the heating step is too low, a large proportion of water soluble material is formed, and the material has extremely high color throw-off. On the other hand, if the temperature is too high, the product becomes very dense and its exchange capacity is accordingly lowered.

The hot particles should then be quenched in cold water. This quenching step appears to affect the resultant product, and, along with the other steps, produces a superior exchange material. The quenched material should then be decanted to drain off the diluted unreacted acid and then washed with cold water to remove strong acids which remain. Washing should thereafter be carried out with hot or boiling water to remove brown colloidal acids which appear to be the primary materials responsible for high color throw-off. This washing with hot water is generally continued until the effluent water becomes colorless. Again, it appears that the hot water wash is much more effective in producing an acceptable product than a sequence of washing steps not involving the hot water wash.

Throughout the operation, close attention must be paid to the size of the solid materials. Swelling and agglomeration occur and the large particles should be reduced in size to about 10 to 12 mesh in order to maintain a properly sized material. It has been found that if crushing of larger sized materials is left until the end of the operation, surfaces are exposed which have not received proper acid, heating and washing. Such crushing of oversize particles is preferably performed throughout the initial acid treatment as well as the subsequent heating or baking period.

Following the washing, the product is subjected to a partial drying operation at a temperature of about 170° to 190° F. As was shown above, it is quite clear that complete drying under ordinary conditions has a highly detrimental effect on the exchange capacity of the material. Apparently, this complete drying causes an irreversible physical change of some kind which prevents the material from ever regaining its full effectiveness. On the other hand, where only partial drying is carried out, the material has a vastly superior change capacity to any of the materials previously produced in accordance with the prior art. The product may contain anywhere from about 20 to 80% of water, and preferably contains about 30 to 40% moisture. Drying is preferably carried out under vacuum but may be on a steam bath or under radiant heating.

The partially dried material is stored in a sealed container to preserve the moisture content. Following partial drying, assuming substantially ion-free water has been used for washing, the material is in its hydrogen cycle form and may be used immediately. If desired, the material may be screened to a mesh size of 20–80 mesh, which is the usual mesh size of most ion exchange materials.

Where it is desired to utilize the material in its sodium cycle form, the material is treated with a strong sodium chloride solution. It has also been found, in accordance with the present invention, that activation with about a 25% or higher sodium chloride solution is much superior to activation with the same amount of sodium chloride in a weaker solution. Sodium chloride should be used in a ratio of about 1 part of sodium chloride to 4 parts of ion exchange material. Following the sodium chloride treatment, the material should again be washed with metal-free water.

While a detailed description and numerous examples have been set forth above, it is to be understood that variations and modifications of the present invention will be apparent to those skilled in the art, all in conformity with well-recognized principles. Accordingly, the present invention is limited only in accordance with the appended claims.

I claim:

1. A method for producing carbonaceous ion exchange materials, comprising: fusing and crushing asphaltenes, obtained by the solvent precipitation of oxidized asphalt to obtain granular asphaltenes having a size of about 20 to 80 mesh; adding about 1–10 parts of 20% oleum to each part of granular asphaltenes while stirring and crushing large particles; maintaining the temperature at least equal to about 180° F. but not more than about 280° F.; when gelation and an apparent dry point is reached, crushing to a size less than about 10 mesh but greater than about 80 mesh; heating the crushed particles to a temperature of about 280° F.–350° F. while stirring; quenching the hot particles in cold water; removing excess liquid from the mixture and washing with additional cold water to remove unreacted strong acids; screening said particles through about a 12 mesh screen; washing the particles passing through said screen with boiling water until the effluent water is colorless; and drying said particles at a temperature of about 170° F. to 190° F. until said particles have a moisture content of about 20–80%.

2. A method in accordance with claim 1 wherein the asphaltenes are obtained by solvent precipitation of oxidized aromatic hydrocarbons obtained from slurry oil produced by the catalytic cracking of crude oil.

3. A method in accordance with claim 1 wherein the asphaltenes are obtained by solvent precipitation of oxidized binder asphalts.

4. A method in accordance with claim 1 which includes the additional steps of: contacting the product with one part of an about 25% solution of NaCl per 4 parts of product; and washing said product of the foregoing step with water to remove excess NaCl.

5. A method in accordance with claim 1 wherein the partially dried product having a moisture content of 20–80% is additionally placed in sealed containers adapted to maintain said moisture content.

References Cited

UNITED STATES PATENTS

| | | | |
|---|---|---|---|
| 2,206,007 | 6/1940 | Liebknecht | 252—428 |
| 2,805,261 | 9/1957 | Keith | 260—614 |
| 2,813,908 | 11/1957 | Young | 260—614 |
| 2,885,336 | 5/1959 | Goren et al. | 208—44 |
| 2,911,373 | 11/1959 | Goren et al. | 208—44 |
| 3,088,924 | 5/1963 | Sindri et al. | 260—2.1 |

OTHER REFERENCES

Dowex: ION Exchange, p. 71—The Dow Chemical Co., Midland, Mich.

DANIEL E. WYMAN, *Primary Examiner.*

P. E. KONOPKA, *Assistant Examiner.*